US008140781B2

(12) United States Patent
Teh et al.

(10) Patent No.: US 8,140,781 B2
(45) Date of Patent: Mar. 20, 2012

(54) MULTI-LEVEL PAGE-WALK APPARATUS FOR OUT-OF-ORDER MEMORY CONTROLLERS SUPPORTING VIRTUALIZATION TECHNOLOGY

(75) Inventors: Chee Hak Teh, Penang (MY); Arthur D Hunter, Cameron Park, CA (US)

(73) Assignee: Intel Corporation, Santa Clara, CA (US)

( * ) Notice: Subject to any disclaimer, the term of this patent is extended or adjusted under 35 U.S.C. 154(b) by 1086 days.

(21) Appl. No.: 11/967,997

(22) Filed: Dec. 31, 2007

(65) Prior Publication Data

US 2009/0172316 A1 Jul. 2, 2009

(51) Int. Cl.
*G09G 5/39* (2006.01)
*G06F 13/00* (2006.01)
*G06F 12/06* (2006.01)
*G06F 12/00* (2006.01)

(52) U.S. Cl. ........ 711/158; 345/531; 345/537; 345/538; 345/568; 345/572; 711/105; 711/206; 711/E12.083; 711/E12.059

(58) Field of Classification Search .................. 345/531, 345/537, 538, 568, 572; 711/105, 158, E12.083, 711/E12.059, 206
See application file for complete search history.

(56) References Cited

U.S. PATENT DOCUMENTS

| 2007/0061549 | A1* | 3/2007 | Kaniyur et al. | 711/207 |
| 2008/0001958 | A1* | 1/2008 | Vembu et al. | 345/531 |
| 2009/0006165 | A1* | 1/2009 | Teh et al. | 705/8 |

OTHER PUBLICATIONS

"Demotion-Based Arbitration", U.S. Appl. No. 11/821,873, filed Jun. 27, 2007, Chee Hak Teh, et al.

* cited by examiner

*Primary Examiner* — Kevin Ellis
*Assistant Examiner* — Mehdi Namazi
(74) *Attorney, Agent, or Firm* — Grossman, Tucker, Perreault & Pfleger, PLLC

(57) ABSTRACT

The invention relates generally to computer memory access. Embodiments of the invention provide a multi-level page-walk apparatus and method that enable I/O devices to execute multi-level page-walks with an out-of-order memory controller. In embodiments of the invention, the multi-level page-walk apparatus includes a demotion-based priority grant arbiter, a page-walk tracking queue, a page-walk completion queue, and a command packetizer.

17 Claims, 6 Drawing Sheets

MULTI-LEVEL PAGE-WALK APPARATUS FOR OUT-OF-ORDER MEMORY CONTROLLERS SUPPORTING VIRTUALIZATION TECHNOLOGY

FIELD

The invention relates generally to computer memory access, and more particularly, but without limitation, to an apparatus and method for performing multi-level page-walks associated with memory virtualization.

BACKGROUND

Virtualization is a broad concept that can be applied to the abstraction of computer resources. An entire computer platform may be virtualized to create a Virtual Machine (VM). In such instances, a host (hardware and software) is configured to execute guest software.

In this context, memory virtualization is enabled by translating Guest Physical Addresses (GPAs) to Host Physical Addresses (HPAs). GPAs may be grouped into pages, and HPAs may be grouped into frames. Accordingly, GPA-to-HPA translations can be described in terms of page-frame translations. To facilitate page-frame translations, some page-frame mappings may be provided in Translation Lookaside Buffers (TLBs). TLBs may be implemented, for example, in CPU cache. Other page-frame mappings may be provided by Page Table Entries (PTEs) stored in system memory. To make better use of system memory, page tables are sometimes stored in a multi-level structure that requires a multi-level page-walk to complete a translation.

Known memory virtualization techniques have many disadvantages, however. For instance, conventional VM's do not provide memory virtualization to Input/Output (I/O) devices. In addition, conventional VM's cannot easily scale memory virtualization to higher bandwidth operation. Moreover, known memory virtualization approaches that are configured to operate with out-of-order memory controllers generally require a substantial number of additional gates to track out-of-order walks in a multi-level page-walk scheme. For at least the foregoing reasons, improved systems and methods are needed for memory virtualization.

BRIEF DESCRIPTION OF THE DRAWINGS

The present invention will be more fully understood from the detailed description below and the accompanying drawings, wherein.

DETAILED DESCRIPTION

Embodiments of the invention will now be described more fully with reference to FIGS. 1 to 7, in which embodiments of the invention are shown. This invention may, however, be embodied in many different forms and should not be construed as limited to the embodiments set forth herein. Rather these embodiments are provided so that this disclosure will be thorough and complete, and will fully convey the scope of the invention to those skilled in the art.

Figure 1:
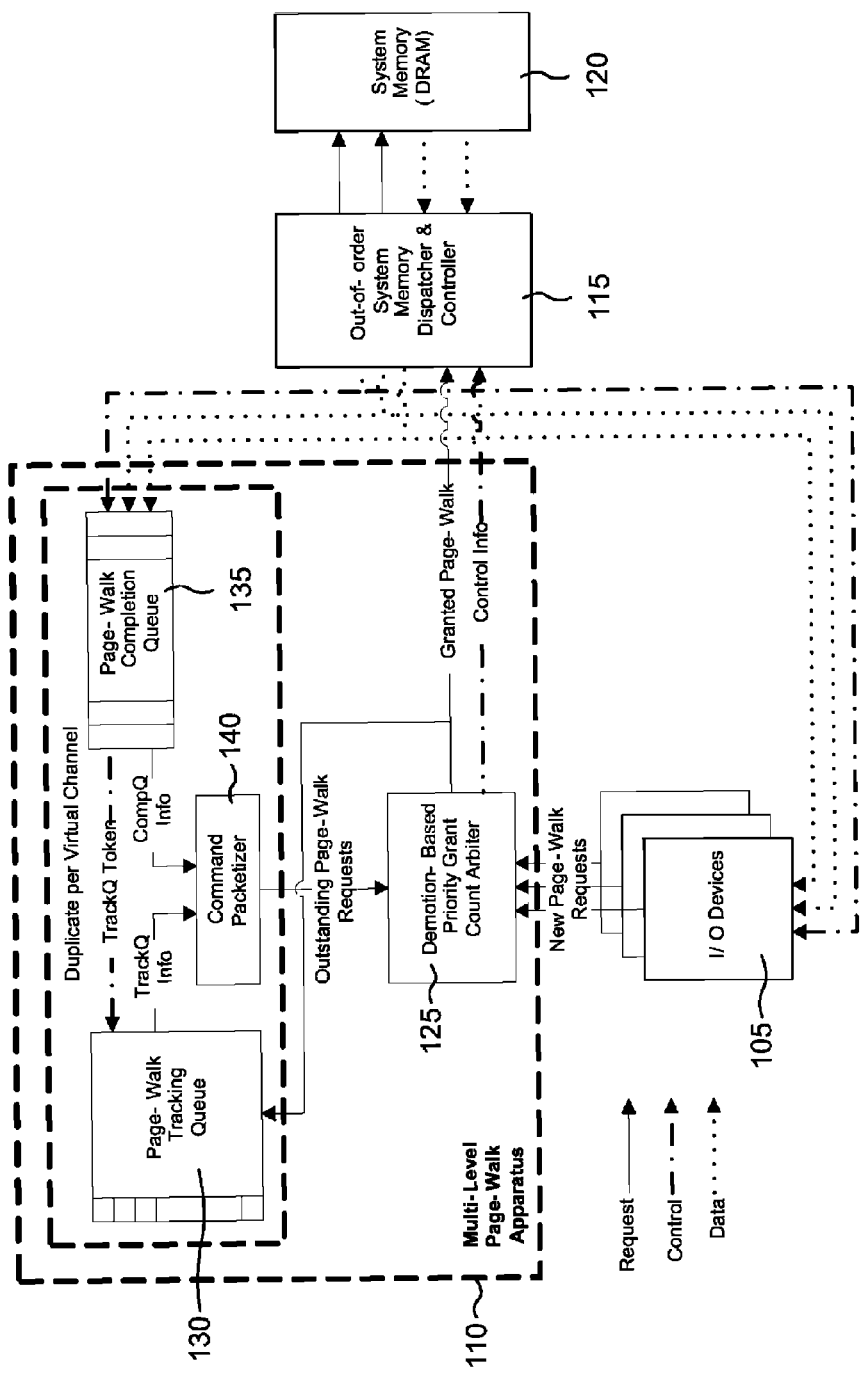
FIG. 1 is a block diagram of a portion of a system that includes a multi-level page-walk apparatus, according to an embodiment of the invention.

FIG. 1 is a block diagram of a portion of a system that includes a multi-level page-walk apparatus, according to an embodiment of the invention. As illustrated in FIG. 1, a multi-level page-walk apparatus (MLPWA) 110 is coupled to I/O devices 105 and an out-of-order system memory dispatcher & controller 115. The out-of-order system memory dispatcher & controller 115 is coupled to system memory 120.

The MLPWA 110 includes a demotion-based priority grant count arbiter (hereinafter arbiter) 125, page-walk tracking queue 130, page-walk completion queue 135, and command packetizer 140. The page-walk tracking queue 130, page-walk completion queue 135 and command packetizer 140 may be duplicated for each additional virtual channel.

The arbiter 125 is configured to receive new page-walk requests from the I/O devices 105 and output the page-walk request and associated control information to the out-of-order memory controller 115 to fetch Page Table Entry (PTE) data from the system memory 120. The arbiter 125 is further configured to output at least portions of the page-walk request to the page-walk tracking queue 130, and to receive outstanding page-walk requests from the command packetizer 140. The arbiter 125 is so named because it is configured to arbitrate between new page walk requests and outstanding page-walk requests.

The page-walk tracking queue 130 is configured to receive page-walk request information associated with a non-final (e.g., non-leaf) level of a multi-level page-walk request from the arbiter 125. The page-walk tracking queue 130 is further configured to receive a token from the page-walk completion queue 135, and output Track_Q information to the command packetizer 140 based on the page-walk request information and the token.

The page-walk completion queue 135 is configured to receive control information and PTE data from the out-of-order system memory dispatcher & controller 115. The page-walk completion queue 135 is further configured to output a token to the page-walk tracking queue 130 and Comp_Q information to the command packetizer 140 based on the received PTE data. The page-walk completion queue 135 may be or include a temporary First-In-First-Out (FIFO) data store.

The command packetizer 140 is configured to receive Track_Q information from the page-walk tracking queue and Comp_Q information from the page-walk completion queue. The command packetizer 140 is further configured to output command packets based on the Track_Q and Comp_Q information to the arbiter 125. The arbiter 125 uses the command packets for the next level walk of outstanding multi-level page-walk requests.

The out-of-order system memory dispatcher & controller 115 is configured to receive control information and page-walk requests from the arbiter 125, fetch PTE data from the system memory 120, and output control signals and the fetched PTE data to the page-walk completion queue 135 and the I/O devices 105.

Variations to the system illustrated in FIG. 1 are possible. For instance, as shown, there may be one or more I/O devices

105. In addition, although the system memory 120 is shown as DRAM, other types of computer memory could also be used, according to design choice.

The MLPWA 110 illustrated in FIG. 1 may be configured to execute the processes described below with reference to FIGS. 2 and 3.

Figure 2:
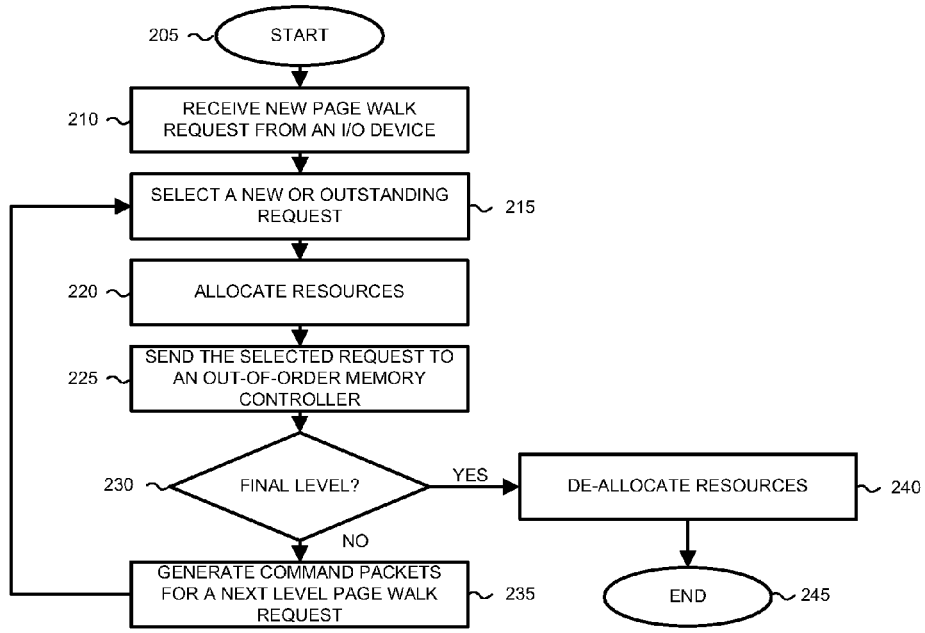
FIG. 2 is a flow diagram of multi-level page-walk method, according to an embodiment of the invention.

FIG. 2 is a flow diagram of multi-level page-walk method, according to an embodiment of the invention. As illustrated in FIG. 2, the process begins in step 205, and receives a new page-walk request from an I/O device in step 210.

The new page-walk request received in step 210 may be coupled with information associated with the request, such as walk level, cycle address, GPA, I/O device and function number, request identification (ID), and GPA width. The walk level provides the number of page-walk levels required for the GPA-to-HPA translation. The cycle address could either be the partially-translated GPA address (e.g., as a result of TLB hits) or the raw GPA (in the case of no TLB hits). The GPA is the original GPA of the cycle. The I/O device and function number may be, for instance, the I/O device and the function number of a Peripheral Component Interconnect (PCI) compliant device. The request ID may be control and routing information from the I/O device that is associated with the cycle to be translated. The GPA width may be the width of the supported GPA (e.g., 48-bits or 39-bits).

The process selects the new page-walk request or an outstanding page-walk request in step 215, and allocates resources associated with the selected page-walk request in step 220. Step 220 may include, for example, ensuring that an agent requiring GPA-to-HPA translation is given adequate processing bandwidth. Step 220 may further include, for instance, ensuring that the page-walk tracking queue 130 has been emptied and/or that there are sufficient resources in the out-of-order system memory dispatcher & controller 115. Once resources have been allocated in step 220, the page-walk request can be granted. Accordingly, the process sends the selected page-walk request and associated control information to an out-of-order system memory dispatcher & controller in step 225. The control information sent to the out-of-order system memory dispatcher & controller in step 225 may include a page-walk tracking queue pointer, a request ID, and a virtual channel ID. The virtual channel ID is the virtual channel ID of the I/O device and is associated with the cycle to be translated.

The process determines whether the selected page-walk request is associated with a final (leaf) level in step 230. Where the process determines that the selected page-walk request is associated with a final level, the process de-allocates resources in step 240 and then terminates in step 240. Where the process determines that the selected page-walk request is not associated with a final level, the process generates command packets associated with a next level page-walk request in step 235, and then returns to step 215. Accordingly, the process repeats steps 215, 220, and 225 for each level of a multi-level page-walk, and the process repeats step 235 for each non-final level of the multi-level page-walk.

The process described with reference to FIG. 2 above can be implemented by the MLPWA 110 illustrated in FIG. 1. More specifically, the arbiter 125 may be configured to execute steps 210, 215, 220, 225, 230, and 240. Together, the page-walk tracking queue 130, the page-walk completion queue 135, and the command packetizer 140 may be configured to execute step 235, as described below.

Figure 3:
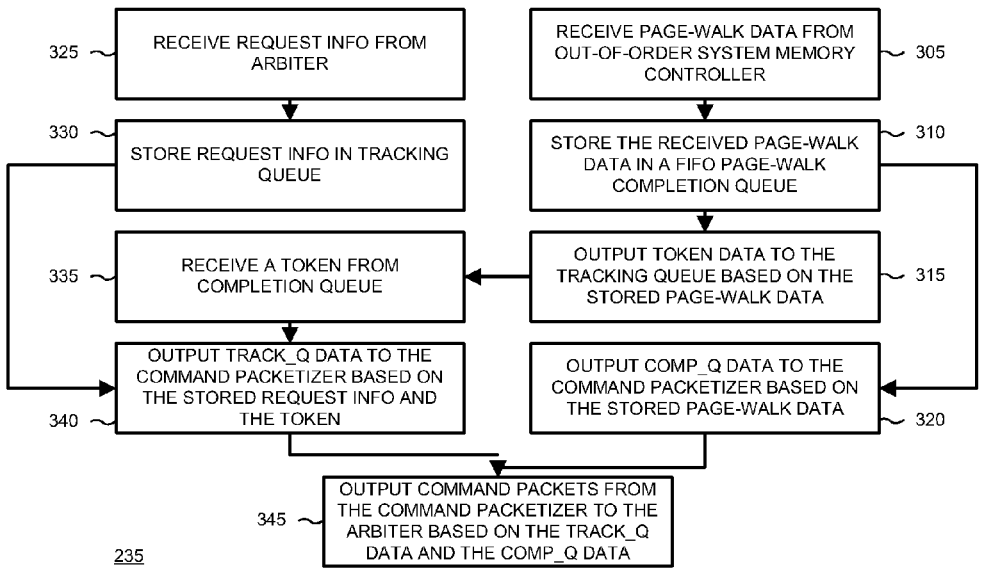
FIG. 3 is a flow diagram of a portion of a multi-level page-walk method, according to an embodiment of the invention.

FIG. 3 is a flow diagram of a portion of a multi-level page-walk method, according to an embodiment of the invention. The process illustrated in FIG. 3 is a detailed embodiment of process step 235 discussed above.

As shown in FIG. 3, the process receives page-walk data from an out-of-order memory controller in step 305, and stores the received page-walk data in a FIFO page-walk completion queue in step 310. The process then outputs a token to the tracking queue based on the stored page-walk data in step 315, and further outputs Comp_Q data to a command packetizer based on the stored page-walk data in step 320.

The process receives request info from an arbiter in step 325, and stores the request info in a tracking queue in step 330. The request info received from the arbiter in step 325 may include, for example, the request ID, I/O device and function number, GPA, and GPA width as described above. The process further receives a token from the completion queue in step 335, and outputs Track_Q data to the command packetizer based on the stored request data and the token in step 340. In embodiments of the invention, step 330 is performed only once for each new page-walk request; after that, the page-walk data received in step 305 (and ultimately, the token received in step 335) is used to index the page-walk tracking queue that was previously allocated and loaded.

The command packetizer outputs command packets to the arbiter based on the Track_Q data and the Comp_Q data in step 345.

The MLPWA 110 may be configured to execute the process illustrated in FIG. 3. More specifically, the page-walk completion queue 135 may be configured to execute steps 305, 310, 315, and 320; the page-walk tracking queue 130 may be configured to execute steps 325, 330, 335, and 340; and the command packetizer 140 may be configured to execute step 345.

The cycle illustrated in FIGS. 2 and 3 repeats for each page-walk request until the leaf level request is granted (except as mentioned above with respect to step 330). When a leaf level request is granted by the arbiter 125, the page-walk tracking queue 130 de-allocates the entry associated with the granted walk. Upon receipt of the leaf completion from the system memory dispatcher & controller 115, the read completion is dropped at the inlet of the page-walk completion queue 135. Only the I/O device 105 consumes the leaf level completion to be stored in its TLB cache to complete the pending GPA-to-HPA translation, as well as for future translations associated with the same virtual page.

Figure 4:
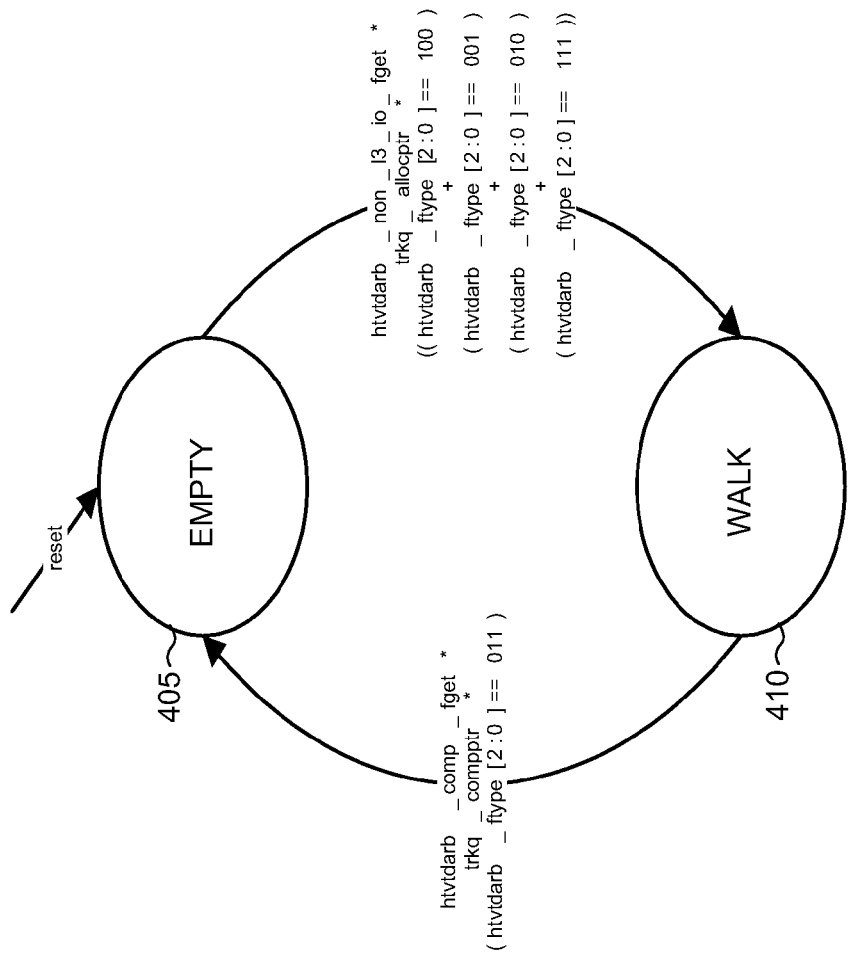
FIG. 4 is a Finite State Machine (FSM) diagram of a page-walk tracking queue, according to an embodiment of the invention.

FIG. 4 is a Finite State Machine (FSM) diagram of the page-walk tracking queue 130, according to an embodiment of the invention. Every entry of the page-walk tracking queue 130 instantiates a FSM that controls the allocation/de-allocation of the associated page-walk tracking queue 130. As illustrated in FIG. 4, there are two states: EMPTY 405, and WALK 410. The EMPTY state 405 indicates the entry is empty and available for allocation. The WALK state 410 indicates that the entry has been allocated for an I/O device page-walk and is waiting for completion of the translation.

The arc term descriptions for the FSM in FIG. 4 are as follows:

reset (the FSM reset);

htvtdarb_non_I3_io_jget (new non-leaf page-walk request granted by the arbiter to this virtual channel);

trkq_allocptr (the page-walk tracking queue allocation pointer pointing to this entry of the page-walk tracking queue of this virtual channel);

htvtdarb_comp_jget (outstanding page-walk request from the page-walk completion queue granted by the arbiter to this virtual channel);

trkq_compptr (the page-walk tracking queue completion pointer pointing to this entry of the page-walk tracking queue of this virtual channel); and htvtdarb_ftype[2:0] (the page-walk request type granted by the arbiter to this virtual channel). In an embodiment of the invention, 100b is a root level fetch, 000b is a context level fetch, 001b is a level 1 fetch, 010b is a level 2 fetch, 011b is a level 3 fetch, and 111b is a level 0 fetch.

Figure 5:
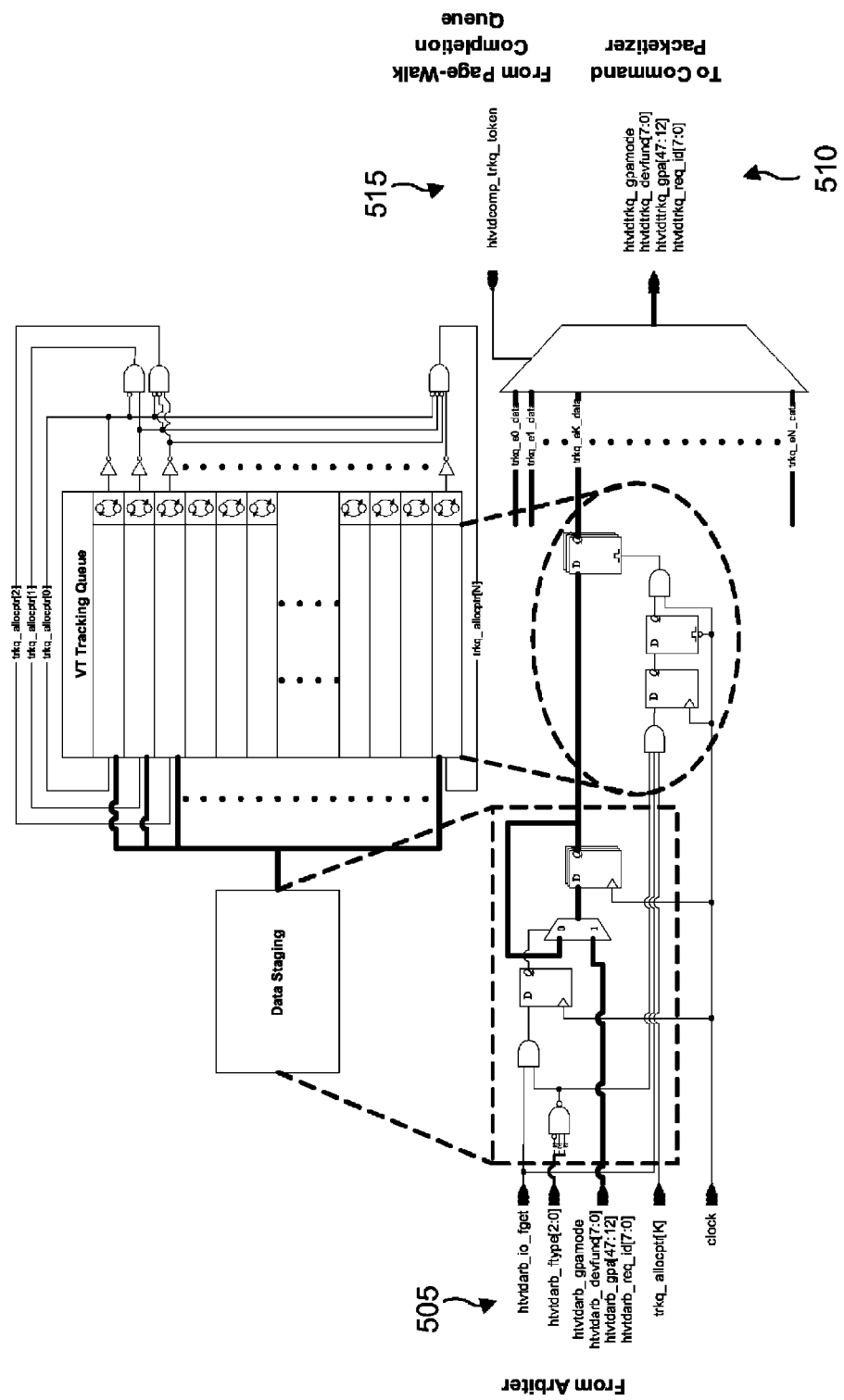
FIG. 5 is a schematic diagram of a page-walk tracking queue, according to an embodiment of the invention.

FIG. 5 is a schematic diagram of the page-walk tracking queue 130, according to an embodiment of the invention. The page-walk tracking queue 130 has one write port 505 (from the arbiter) and one read port 510. The read port 510 is indexed by a token 515 from the page-walk completion queue 135, and provides the Comp_Q information to the command packetizer 140.

The page-walk tracking queue 130 maintains two pointers. An allocation pointer points to the first available entry in the page-walk tracking queue 130 that is EMPTY. The allocation pointer may be a 1-hot pointer that is generated by doing a first available search on all page-walk tracking queue 130 entries that are in the EMPTY state. A completion pointer points to the page-walk tracking queue 130 entry that corresponds to the entry at the outlet of the page-walk completion queue 135. When the page-walk tracking queue is allocated, the allocation pointer and the completion pointer point to the same entry. The completion pointer is advanced for each level of page-walk, however. The completion pointer is passed to the out-of-order system memory dispatcher & controller 135 as part of the control information sent with a page-walk request.

Figure 6:
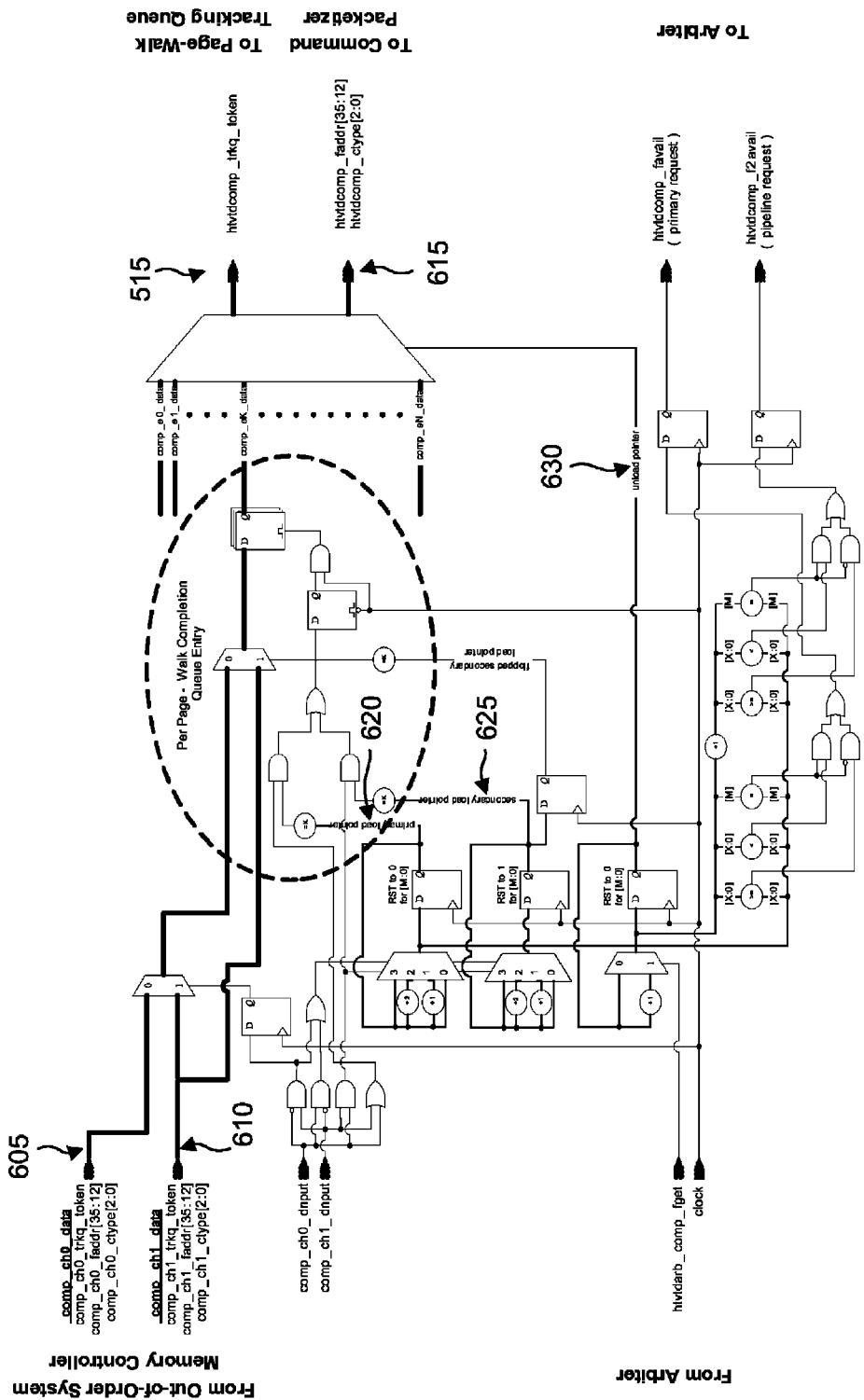
FIG. 6 is a schematic diagram of a page-walk completion queue, according to an embodiment of the invention.

FIG. 6 is a schematic diagram of the page-walk completion queue 135, according to an embodiment of the invention.

In the system described above with reference to FIG. 1, the out-of-order memory dispatcher & controller 115 is configured to pass the fetched PTE to the page-walk completion queue 135 as well as to the I/O devices 105. The I/O devices 105 are configured to use the request ID and virtual channel ID tagged on the read completion of the fetched PTE to identify the request and its level of walk. Upon receipt of a PTE that belongs to the I/O device, the I/O device may cache the fetched PTE and utilize it for current and future translations.

The page-walk completion queue 135 is configured to place the fetched PTE into FIFO storage in the order of PTE arrival. The order of arrival is not in the order of request, since the system memory controller is out-of-order. As indicated above, only non-leaf PTEs (e.g., non-level 3 PTEs) are stored in the page-walk completion queue 135. The non-leaf PTE are tagged with the following information:

a page-walk tracking queue pointer (points to the entry that was allocated when the new page-walk request is granted by the arbiter);

a partial request ID (only the fetch type is stored as it is required to generate the next level walk request to the arbiter); and a next level walk base address from PTE (the next level walk base address from the PTE is required to know where the next level PTE for the multi-level page-walk resides).

The page-walk completion queue 135 has as many write ports as there are DRAM channels. The embodiment illustrated in FIG. 6 supports two DRAM channels, channel 0 and channel 1. Accordingly, the page-walk completion queue 135 has two writes ports 605 and 610, and one read port 615 (for the command packetizer).

The page-walk completion queue may be implemented as a circular queue that utilizes three pointers:

a primary load pointer 620 (points to the entry of the FIFO that is next to be loaded with the read completion packet. This pointer is incremented by one when there is a single read completion on the DRAM channels and incremented by two when there are simultaneous read completions on both the DRAM channels. The pointer is initialized to zero upon reset);

a secondary load pointer 625 (points to the entry of the FIFO that is next to be loaded with the read completion packet. This pointer is incremented by one when there is a single read completion on the DRAM channels and incremented by two when there are simultaneous read completions on both the DRAM channels. The pointer is initialized to one upon reset); and an unload pointer 630 (points to the entry of the FIFO that is next to be unloaded/requested to the arbiter. This pointer is incremented by one when there is a grant given by the arbiter for its request. This pointer is initialized to zero upon reset).

The primary load pointer 620 is used when there is a single read completion in a given clock, e.g. on DRAM channel 0 or DRAM channel 1. The location of the FIFO pointed to by the primary load pointer 620 is used to load the completion packet from that DRAM channel. When there are simultaneous completions from both DRAM channels in the same clock, the read completion from DRAM channel 0 is loaded into the location pointed by the primary load pointer 620 and the read completion from DRAM channel 1 is loaded into the location pointed by the secondary load pointer 625. The order in which the read completion packets are loaded into the page-walk completion queue 135 dictates the arbitration order amongst outstanding multi-level page-walk requests. Merger of the outstanding request arbitration and the storage order reduces the number of gates required for the implementation.

Detailed implementation of the page-walk completion queue 135 is described by the following equations:

$$M=(\log_2(N+1)), \text{ and}$$

$$X=(M-1),$$

where M is the wrap bit of the page-walk completion queue pointers, (N+1) is the number of entries in the page-walk tracking/completion queue, and X is the page-walk completion queue pointers' Most Significant Bit (MSB) that points to the entry location in the page-walk completion queue 135.

Figure 7:
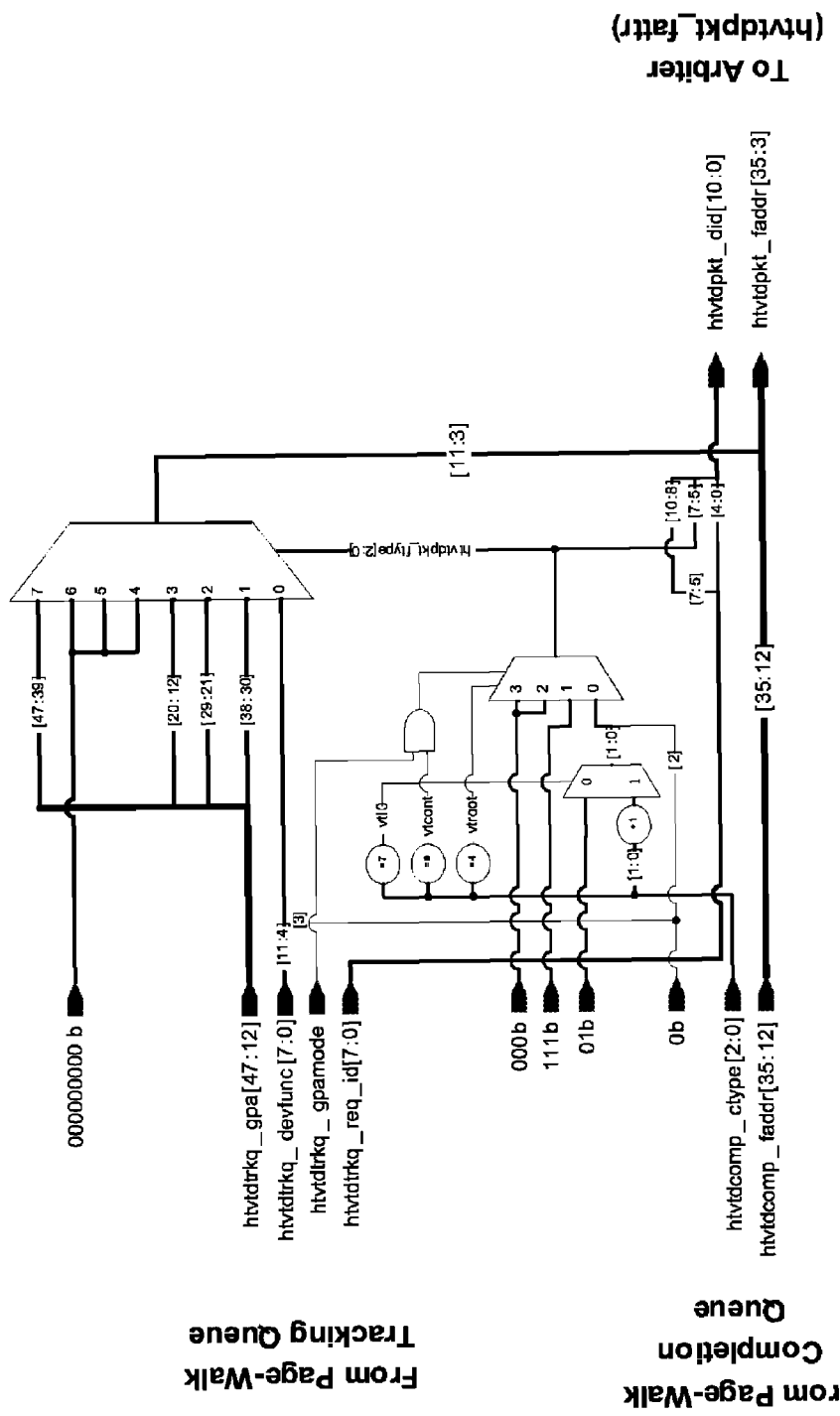
FIG. 7 is a schematic diagram of a command packetizer, according to an embodiment of the invention.

FIG. 7 is a schematic diagram of the command packetizer 140, according to an embodiment of the invention. The command packetizer 140 is configured to combine Track_Q information from the page-walk tracking queue 130 with Comp_Q information from the page-walk completion queue 135 and present the combined information to the arbiter 125 for arbitration of the next level PTE fetch from system memory. The combined information that the command packetizer 140 presents to the arbiter 125 includes an indication of the next level of walk to be performed.

The MLPWA and methods described herein are advantageous in several respects. In one respect, embodiments of the invention are configured to enable memory virtualization for I/O devices in a system that includes an out-of-order memory dispatcher & controller. In another respect, embodiments of the invention provide a scalable solution, since the depth of page-walk tracking and completion queues may be increased, according to application needs. In yet another respect, embodiments of the MLPWA eliminate the need for gates associated with tier-based arbitration of multi-level page-walks.

It will be apparent to those skilled in the art that modifications and variations can be made without deviating from the spirit or scope of the invention. Thus, it is intended that the present invention cover any such modifications and variations of this invention provided they come within the scope of the appended claims and their equivalents.

The invention claimed is:

1. A system comprising:
   a multi-level page-walk apparatus;
   an out-of-order memory controller coupled to the multi-level page-walk apparatus; and
   an Input/Output (I/O) device coupled to the multi-level page-walk apparatus and the out-of-order memory controller, the multi-level page-walk apparatus configured to receive a new page-walk request from the I/O device, the multi-level page-walk apparatus further configured to output the new page-walk request to the out-of-order memory controller, the out-of-order memory controller configured to fetch Page Table Entry (PTE) data from a system memory and output the PTE data to the multi-level page-walk apparatus and the I/O device;
   wherein the multi-level page-walk apparatus includes a demotion-based priority grant count arbiter coupled to the out-of-order memory controller, the demotion-based priority grant count arbiter configured to arbitrate between the new page walk request and at least one outstanding page-walk request.

2. The system of claim 1, wherein the multi-level page-walk apparatus further includes:
   a first page-walk tracking queue coupled to receive page-walk request information from the demotion-based priority grant count arbiter;
   a first page-walk completion queue coupled to receive the PTE data from the out-of-order memory controller; and
   a first command packetizer coupled to receive tracking data from the first page-walk tracking queue and completion data from the first page-walk completion queue, the first command packetizer further configured to output the at least one outstanding page-walk request to the demotion-based priority grant count arbiter.

3. The system of claim 2, wherein the multi-level page-walk apparatus further includes:
   a second page-walk tracking queue coupled to the demotion-based priority grant count arbiter;
   a second page-walk completion queue coupled to the out-of-order memory controller; and
   a second command packetizer coupled to the second page-walk tracking queue and the second page-walk completion queue, wherein the first page-walk tracking queue, the first page-walk completion queue, and the first command packetizer are associated with a first virtual channel, and wherein the second page-walk tracking queue, the second page-walk completion queue, and the second command packetizer are associated with a second virtual channel.

4. The system of claim 2, wherein the first page-walk tracking queue is coupled to receive a token from the first page-walk completion queue and configured to output the tracking data based on the page-walk request information and the token.

5. The system of claim 2, wherein the first page-walk tracking queue is configured to instantiate a finite state machine having an empty state and a walk state, the empty state indicating that an entry to the first page-walk tracking queue is available for allocation, the walk state indicating that an entry to the first page-walk tracking queue has been allocated for an I/O device page-walk and is waiting for completion of a translation.

6. The system of claim 5, wherein the first page-walk tracking queue includes:
   an allocation pointer configured to point to a first available entry in the first page-walk tracking queue that is in an empty state; and
   a completion pointer configured to point to an entry in the page-walk tracking queue that corresponds to an entry at the outlet of the page-walk completion queue.

7. The system of claim 2, wherein the first page-walk completion queue includes:
   a first write port associated with a first DRAM channel; and
   a second write port associated with a second DRAM channel.

8. The system of claim 2, wherein the first page-walk completion queue includes a First-In-First-Out (FIFO) store.

9. The system of claim 8, wherein the first page-walk completion queue includes:
   a primary load pointer configured to point to an entry of the FIFO store that is next to be loaded with a read completion packet from the out-of-order memory controller;
   a secondary load pointer configured to point to the entry of the FIFO store that is next to be loaded with the read completion packet from the out-of-order memory controller; and
   an unload pointer configured to point to an entry of the FIFO store that is next to be unloaded to the demotion-based priority grant count arbiter, the system configured to use the primary load pointer for a single read completion on a first DRAM channel in a clock cycle, the system configured to use the primary load pointer and the secondary load pointer for a simultaneous read completion on the first DRAM channel and a second DRAM channel in the clock cycle.

10. A method for accessing a system memory, comprising:
    receiving a new page-walk request from an Input/Output (I/O) device;
    selecting one of the new page-walk request and an outstanding page-walk request to produce a selected page-walk request; and
    sending the selected page-walk request to an out-of-order memory controller;
    allocating resources associated with the selected page-walk request;
    determining whether the selected page-walk request is associated with a final level of a multi-level page-walk request; and
    if the selected page-walk request is associated with the final level of the multi-level page-walk request, de-allocating the resources.

11. The method of claim 10, wherein receiving the new page-walk request includes receiving a walk level, a Guest Physical Address (GPA), an I/O device number, a request identification, and a GPA width value.

12. The method of claim 10, wherein allocating the resources includes ensuring that an agent requiring GPA-to-HPA translation is given adequate processing bandwidth.

13. The method of claim 10 further comprising, if the selected page-walk request is not associated with the final level of the multi-level page-walk request, generating command packets for a next level of the multi-level page-walk request.

14. The method of claim 10 further comprising, if the selected page-walk request is associated with the final level of the multi-level page-walk request, de-allocating the resources.

15. A method for accessing a system memory, comprising:
receiving a new page-walk request from an Input/Output (I/O) device;
selecting one of the new page-walk request and an outstanding page-walk request to produce a selected page-walk request; and
sending the selected page-walk request to an out-of-order memory controller;
allocating resources associated with the selected page-walk request;
determining whether the selected page-walk request is associated with a final level of a multi-level page-walk request; and
if the selected page-walk request is not associated with the final level of the multi-level page-walk request, generating command packets for a next level of the multi-level page-walk request.

16. The method of claim 15, wherein receiving the new page-walk request includes receiving a walk level, a Guest Physical Address (GPA), an I/O device number, a request identification, and a GPA width value.

17. The method of claim 15 wherein allocating the resources includes ensuring that an agent requiring GPA-to-HPA translation is given adequate processing bandwidth.

* * * * *